United States Patent
Yada et al.

(10) Patent No.: US 8,764,274 B2
(45) Date of Patent: Jul. 1, 2014

(54) KNEADING TANK INVERSION DISCHARGING SEALED PRESSURIZED TYPE KNEADING MACHINE

(75) Inventors: Yasuo Yada, Yokkaichi (JP); Tatsuo Yada, Yokkaichi (JP)

(73) Assignee: Suzuka Engineering Co., Ltd., Yokkaichi, Mie (JP)

( * ) Notice: Subject to any disclaimer, the term of this patent is extended or adjusted under 35 U.S.C. 154(b) by 260 days.

(21) Appl. No.: 13/378,985

(22) PCT Filed: Jun. 7, 2010

(86) PCT No.: PCT/JP2010/059604
§ 371 (c)(1),
(2), (4) Date: Dec. 16, 2011

(87) PCT Pub. No.: WO2010/147014
PCT Pub. Date: Dec. 23, 2010

(65) Prior Publication Data
US 2012/0087202 A1    Apr. 12, 2012

(30) Foreign Application Priority Data
Jun. 19, 2009    (JP) .................................. 2009-146699

(51) Int. Cl.
*B28C 7/16*     (2006.01)
*B29B 7/00*     (2006.01)

(52) U.S. Cl.
USPC .......................................... 366/77; 366/76.7

(58) Field of Classification Search
CPC ...... B29C 47/367; B29C 47/50; B29C 47/60; B29B 7/183
USPC ................. 366/76.6, 76.8, 189, 77, 185, 76.7
See application file for complete search history.

(56) References Cited

U.S. PATENT DOCUMENTS 1,324,170 A * 12/1919 Pletscher ......................... 366/77
6,183,124 B1 * 2/2001 Voegtlin .......................... 366/91
7,476,017 B2 * 1/2009 Mortimer et al. ............. 366/76.7

FOREIGN PATENT DOCUMENTS

JP         04016223        1/1992
JP         H591809         12/1993
(Continued)

OTHER PUBLICATIONS

Supplementary European Search Report for EP10 78 9389 dated Apr. 26, 2013.

(Continued)

*Primary Examiner* — Tony G Soohoo
*Assistant Examiner* — Anshu Bhatia
(74) *Attorney, Agent, or Firm* — Fitch, Even, Tabin & Flannery, LLP

(57) ABSTRACT

A kneading machine is provided having a kneading tank with kneading rotors therein and a stocking opening. The kneading machine may also include a pressurizing lid for opening and closing the kneading tank and an inner-pressure cover. The kneading tank is capable of inverting in a range of 90° to 120° for discharging the kneaded materials. A front wall defining the stocking opening may be attached so as to be suspended downward from the kneading tank by a hinge when the kneading tank is inverted. The kneading machine may also include a capturing apparatus with a duct connected to the inner-pressure cover to capture powder compound jetted into the inner-pressure cover, and the powder compound captured in a filter of the capturing apparatus can be collected into the kneading tank.

15 Claims, 6 Drawing Sheets

(56) References Cited

FOREIGN PATENT DOCUMENTS

| | | |
|---|---|---|
| JP | 09313916 | 12/1997 |
| JP | 2004066039 | 3/2004 |
| JP | 2005237996 | 9/2005 |
| JP | 2006116400 | 5/2006 |
| JP | 2006167618 | 6/2006 |
| JP | 2006305514 | 11/2006 |
| KR | 100830881 B1 | 5/2008 |
| KR | 100930880 B1 | 5/2008 |

OTHER PUBLICATIONS

International Search Report for PCT/JP2010/059604 dated Jun. 29, 2010.

* cited by examiner

KNEADING TANK INVERSION DISCHARGING SEALED PRESSURIZED TYPE KNEADING MACHINE

CROSS REFERENCE TO RELATED APPLICATIONS

This application is a national phase application of International Application No. PCT/JP2010/059604, filed Jun. 7, 2010, claiming priority to Japanese Application No. 2009-146699, filed Jun. 19, 2009, both of which are incorporated by reference herein in their entirety.

TECHNICAL FIELD

Batch type kneading machines, which have been conventionally known popularly, for high-viscosity materials to be kneaded such as rubbers and plastics include an opened type and a sealed pressurized type (see Patent Document 1, for example). The sealed pressurized type kneading machine for high-viscosity materials includes a kneading tank bottom open discharging type (drop door type) and a kneading tank inversion discharging type (tilting type) (see Patent Document 2, for example. The present invention relates to a kneading machine of both the kneading tank inversion discharging type and the sealed pressurized type.

BACKGROUND ART

The conventionally-known kneading machine of both the kneading tank inversion discharging type and the sealed pressurized type is superior in economy and the like such as facility construction expenses compared with the kneading machine of the kneading tank bottom open discharging type, but has the following problems: (1) operations for discharging kneaded materials by inverting the kneading tank require time and labor; and (2) when a pressurizing lid is being closed, it is impossible to restrain jets of powder compound from a stocking opening of the kneading tank in which the inputted powder compound is accommodated.

Hereinafter, description is made on the above-mentioned problems further concretely. Firstly, as for the item (1), as shown in FIG. 7 (parts corresponding to those of an embodiment described below are denoted by the same reference symbols as the embodiment), in order to discharge the kneaded materials which are finished being kneaded in the kneading tank, generally, two kneading rotors 10 in the tank are by appropriately rotated forward and backward with a state in which a kneading tank 3 provided with the two kneading rotors 10 therein is inverted by 140 to 160° about the axis of a rotation shaft 11 of one of the kneading rotors 10 to thereby discharge the kneaded materials A from the kneading tank 3. However, when the inverting angle of the kneading tank 3 is 140 to 160°, even if an inversion direction side wall 8b of opening walls 8 surrounding four sides of a stocking opening 4 in an upper surface of the kneading tank serves as a chute, the kneaded materials A of high-polymer compounds having high viscosity have high friction, and at least considerable amount thereof does not slip down the chute, and hence an operator is compelled to conduct a discharging assist operation for raking off the kneaded materials A by a tool like a rake. In addition, such operation is extremely dangerous because this operation is a raking-off operation performed while rotating the kneading rotors. Therefore, it is strongly desired that an easy measure can eliminate necessity of man's operation. Further, an operator must move between the front and the rear of the kneading machine carrying out stocking operations and discharging operations in each batch, and this extends a batch cycle and causes loss of productivity.

In order to solve such problems, if the inverting angle of the kneading tank 3 is further increased, for example, to 180°, such a situation does not occur that the kneaded materials A contact the chute and discharging is hindered and time and labor for slipping down is required. However, high-speed and wide-range raising and inverting operations require a high-energy driving apparatus and a firm structure for a mechanism for absorbing shocks of a stop operation at the time of inversion completion caused by speed increase. Therefore, increase of inversion speed and expansion of inverting angle are limited in view of facility expenses and energy reduction. In addition, even with the above-mentioned inverting angle of 140 to 160° of the kneading tank 3, time period for inversion operations is longer than that of the kneading tank bottom open discharging type kneading machine, and therefore there is a problem in productivity.

Further, in the structure in which a surface of the stocking opening of the kneading tank 3 is inverted by 180° to discharge the kneaded materials A, the surface of the stocking opening of the inverted kneading tank 3 becomes low, and hence, it is necessary to excavate in a floor surface a space for inserting a receiving container 37 for the kneaded materials A to be discharged. If a pit is not provided by excavating the floor surface, such an arrangement is essential where the kneading machine is disposed on a base and the kneaded materials A are dropped from a high place to be discharged into the receiving container 37. However, if the kneading machine is disposed at the high place, economy in facility construction at the initial stage or at removal of facilities is deteriorated, the economy being superior in the kneading tank inversion discharging type kneading machine than that of the kneading tank bottom open discharging type. Accordingly, in the present situation, there is no choice but to introduce the inversion discharging type kneading machine which performs inversion by 140°, with holding the poor productivity of the inversion discharging type kneading machine.

The above-mentioned problem (2) is a problem that it is necessary to take measures against upward jetting of a great deal of powder compound inputted to the kneading tank 3 so as to be kneaded with respect to high-viscosity materials to be kneaded such as rubbers and plastics, with being accompanied by the air pushed out from a kneading chamber 7 by descending of a pressurizing lid 5 into the stocking opening 4, through a gap between four sides of the pressurizing lid 5 and the opening walls 8 of four sides of the kneading tank 3. That is to say, in the sealed pressurized type kneading machine, the above-mentioned jetting phenomenon of the powder compound is inevitable because the pressurizing lid 5 is rapidly pushed into the kneading chamber immediately after input of various kinds of materials into the kneading tank 3.

In order to deal with the above-mentioned problems, even if dusts from the stocking opening 4 of the kneading tank 3 is absorbed by an external dust catching machine provided in the vicinity of the stocking opening 4 to restrain diffusion of dusts, the amount of outflow from the inputted compound is uncertain. Therefore, even if the dusts captured by the dust catching machine are returned to the kneading tank 3, it is impossible to provide kneaded materials with accurate compound prescription. In addition, powder compound and the like of compound prescription in a plurality of batches get mixed in the powder compound collected by the dust catching machine, and hence, the absorbed amount and mixed rate in each compound of the caught dusts (fine particles) are also uncertain. Therefore, it is impossible to distribute and mix the caught dusts in kneading batches.

Accordingly, there is no choice but to dispose of the powder compound collected by the external dust catching machine as dusts. This situation not only generates loss of resources, but also leads to completion of kneaded materials which do not strictly follow the compound prescription as a result of partial diffusion of the powder compound. Therefore, mass-production with reproductivity of design quality is not achieved, and reliability of the quality is spoiled.

PRIOR ART DOCUMENT

Patent Document

Patent Document 1: Japanese Patent Application Laid-open No. Hei 9-313916
Patent Document 2: Japanese Patent Application Laid-open No. 2006-305514

SUMMARY OF THE INVENTION

Problems to be Solved by the Invention

A technical object of the present invention is to provide a kneading tank inversion discharging sealed pressurized type kneading machine that solves by a simple means the above-mentioned problem (1) that the operations for discharging the kneaded materials require time and labor, and facilitates discharging of the kneaded materials without increasing the inverting angle of the kneading tank. Another technical object of the present invention is to provide a kneading tank inversion discharging sealed pressurized type kneading machine that solves the above-mentioned problem (2), and cannot restrain jetting of powder compound from the kneading tank accommodating the inputted powder compound but can collect the powder compound as accurately and efficiently as possible in each batch.

Means for Solving the Problems

In order to solve the above-mentioned problems, according to the present invention, there is provided a kneading tank inversion discharging sealed pressurized type kneading machine for high-viscosity materials to be kneaded including: a kneading tank having a stocking opening that is provided in an upper surface thereof and made closable by an openable and closable pressurizing lid, and two rotating kneading rotors provided in parallel in the kneading tank, the kneading tank being capable of inverting about an axis of one of the kneading rotors for discharging kneaded materials, which is characterized in that opening walls having inner surfaces along which a circumference of the pressurizing lid ascends and descends are provided so as to surround four sides of the stocking opening in an upper part of the kneading tank, a front wall that is positioned at an inversion side of the kneading tank of the opening walls is separated from the opening walls positioned at an other side, and a lower end of the front wall is rotatably attached to the kneading tank with a hinge in order that the front wall is suspended downward from the kneading tank when the kneading tank is inverted, and the kneading tank is capable of inverting in a range of 90 to 120° from a position at which the stocking opening faces upward. Hereinafter, more concrete description is made of this structure. The kneading tank inversion discharging sealed pressurized type kneading machine according to the present invention is structured as follows: in a kneading machine including the kneading tank in which the stocking opening provided in the upper surface thereof can be closed by the openable and closable pressurizing lid, two parallel kneading rotors that are rotatably supported in the kneading tank and have shafts for rotation connected to a driving source, and a kneading tank inversion mechanism for inverting the kneading tank about an axis of one of the kneading rotors for discharging the kneaded materials, the above-mentioned kneading tank including the opening walls surrounding four sides of the stocking opening in the upper part, and the circumference of the pressurizing lid ascending and descending along the inner surfaces of the opening walls, the front wall positioned on the inversion side of the kneading tank in the opening walls is separated from the opening walls positioned on the other side, the lower end of the front wall is rotatably attached to the kneading tank by the hinge, the kneading tank is provided with a kneading tank inversion mechanism for inverting in a range of 90 to 120° from a position at which the stocking opening faces upward, and the kneading tank is provided with a driving mechanism for suspending downward the front wall from the kneading tank at the time of inversion of the kneading tank by the kneading tank inversion mechanism.

In a preferred embodiment of the kneading tank inversion discharging sealed pressurized type kneading machine according to the present invention, the kneading tank is constituted by horizontally disposing two C-shaped partial cylinders so as to be opposed to each other and become continuous with each other, a kneading rotor is provided in each of the two partial cylinders of the kneading tank, and shafts of both the kneading rotors are rotatably supported by a pair of end plates connected to both ends of the partial cylinders and the shafts are connected to a driving source that rotatably drives the shafts. In addition, cramps that are engaged and disengaged with respect to front edges of the end plates of the kneading tank forming the adjacent opening walls are provided to both ends, respectively, of the front wall of the opening walls, the front wall is displaceable between a kneading position and a kneaded material discharging position by making support shafts provided to a lower end of the front wall of the opening walls to constitute the hinge rotatable by a driving mechanism supported by the end plate, the kneading position being a position at which the cramps are engaged with the front edges of the end plates and the stocking opening of the kneading tank is surrounded, the kneaded material discharging position being a position at which the cramps are disengaged and the front wall is suspended downward for discharging the kneaded materials by inversion of the kneading tank.

In another preferred embodiment of the kneading tank inversion discharging sealed pressurized type kneading machine according to the present invention, the support shafts provided to the lower end of the front wall to constitute the hinge are rotatably supported by a bearing provided to the end plate, an outer end of the support shaft protruding to an outside through the bearing of the end plate is connected to an arm protruding to a direction orthogonal to an axis direction of the support shaft, and a tip end of the arm and a tip end of a piston rod of a driving cylinder that is supported by the end plate and constitutes a driving mechanism are rotatably connected to each other by a pin, and the driving cylinder makes the front wall to be displaceable between the kneading position at which the stocking opening is surrounded and the kneaded material discharging position for discharging the kneaded materials.

In the kneading tank inversion discharging sealed pressurized type kneading machine according to the present invention, there is provided an inner-pressure cover that seals the stocking opening of the kneading tank by covering the stocking opening of the kneading tank together with the pressurizing lid that opens and closes the upper surface of the stocking opening and by being brought into pressure-contact with peripheries of the opening walls of the kneading tank by an ascending and descending mechanism, and a piston rod in a fluid-pressure cylinder apparatus on a support frame that drives the pressurizing lid to ascend and descend the same is penetrated airtightly and slidably through the inner-pressure cover, an interior space of the inner-pressure cover is structured so that, in the state in which the inner-pressure cover is in pressure-contact with the peripheries of the opening walls of the kneading tank, the pressurizing lid is movable upward at least by an intermediate stop position at which the pressurizing lid reaches upper end portions of the opening walls, thereby, there are constituted: a compound sealing mechanism for retaining, in the inner-pressure cover, the powder compound together with a replaced air jetting from the kneading tank into the inner-pressure cover through the circumference of the pressurizing lid with accompanying the powder compound when the pressurizing lid is descended from the intermediate stop position in the state in which the inner-pressure cover is in pressure-contact with the peripheries of the opening walls of the kneading tank; and a collecting mechanism for absorbing and collecting the powder compound collected with a pressure decrease in an interior of the kneading tank below the pressurizing lid due to ascending of the pressurizing lid of the kneading tank by collecting the powder compound accumulated in a space between the inner-pressure cover and the pressurizing lid by an air blow in a circumferential portion of the pressurizing lid.

In such case, the following is desired: to an exhaust hole provided in a top plate of the inner-pressure cover, a duct of a capturing apparatus equipped with a filter for capturing the powder compound jetting into the inner-pressure cover with accompanying the air jetting at the time of pressure increase in the kneading tank is connected, and an interior of the inner-pressure cover is made continuous with the atmosphere through the filter in the capturing apparatus, the duct is provided upright in a driving direction of the inner-pressure cover by the ascending and descending mechanism, and a top plate of the support frame is slidably penetrated through the duct, and the capturing apparatus is provided with a pressurizing air-nozzle that rakes off, from the filter, the powder compound captured in the filter by an air current in a direction opposite to the capturing and returns the powder compound into the inner-pressure cover through the duct. Further, the following is desired: a cover member that covers an upper surface of the pressurizing lid is provided to the pressurizing lid as a means for collecting the powder compound accumulated in the inner-pressure cover by the air blow, an upper surface of the cover member is formed as a slope portion, and the inner-pressure cover is provided with an air nozzle that blows off the powder compound accumulated on the slope portion to a downstream side of the slope portion.

In the kneading tank inversion discharging sealed pressurized type kneading machine having the above-mentioned structure of the present invention, at the time of discharging of the kneaded materials from the kneading tank, the opening wall on the front surface of the kneading tank is suspended downward and does not constitute a discharging chute which hinders dropping of the kneaded materials. In addition, time required for inversion is short because it is the inversion in the angle range of 90 to 120°, and this contributes to shortening of a batch cycle. In addition to the above, a small range of rolling and rising movement does not require a high-output driving apparatus, and it is possible to select a fluid-pressure thrusting type small driving mechanism instead of an electric rotation type, and to miniaturize and simplify a mechanism for absorbing shock of a stop movement at the time of inversion completion. Accordingly, production costs can be drastically reduced and maintenance can be facilitated.

Further, because there is provided a collecting mechanism which enables the powder compound jetting from the kneading tank after being inputted to the kneading tank to be captured in the inner-pressure cover provided on the kneading tank and to be collected in the same batch so as to be kneaded therein without being absorbed by the external dust catching machine for improving environment around the kneading machine, powder compound of different batch in view of quality control is not mixed. This is an important function relating to the quality of the kneaded material. In addition, this has a large effect on valuable collection of the compound and reduction of dust wastes.

Effect of the Invention

According to the kneading tank inversion discharging sealed pressurized type kneading machine of the present invention described in detail above, it is possible to provide a kneading tank inversion discharging sealed pressurized type kneading machine which can, by a simple means, solve the problem that the discharging operations of the kneaded materials take time and labor, and can collect as accurately and efficiently as possible in each batch the powder compound jetting from the kneading tank accommodating the inputted powder compound although it cannot restrain jetting of the powder compound from the kneading tank.

MODES FOR CARRYING OUT THE INVENTION

Figure 1:
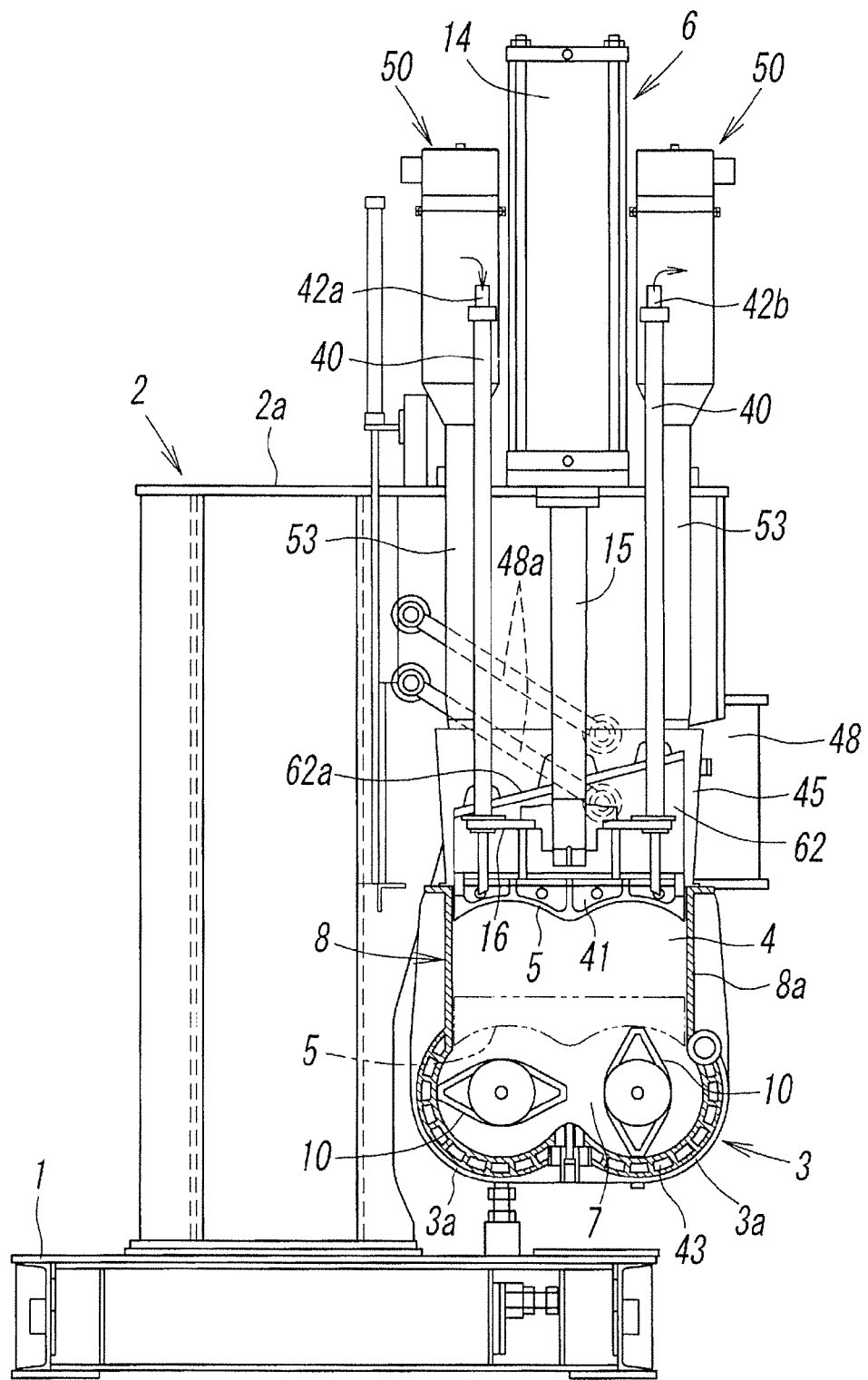
FIG. 1 A side view showing important portions of a kneading tank inversion discharging sealed pressurized type kneading machine according to the present invention in a vertical section.
Figure 2:
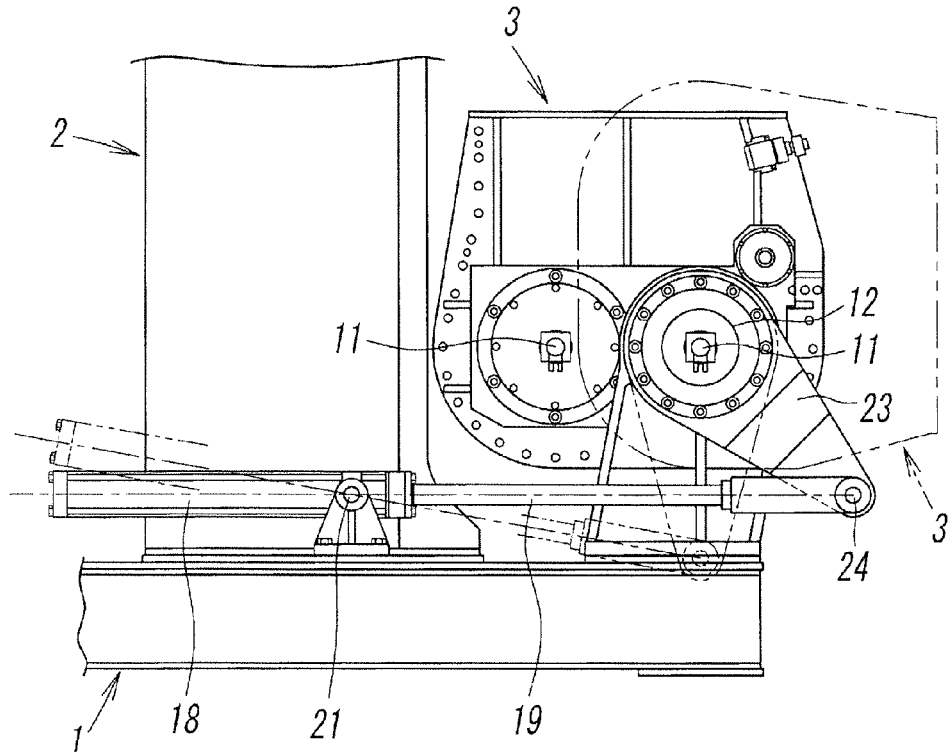
FIG. 2 An enlarged side view of important portions showing a structure of an inversion mechanism of the kneading tank in the above-mentioned embodiment.
Figure 3:
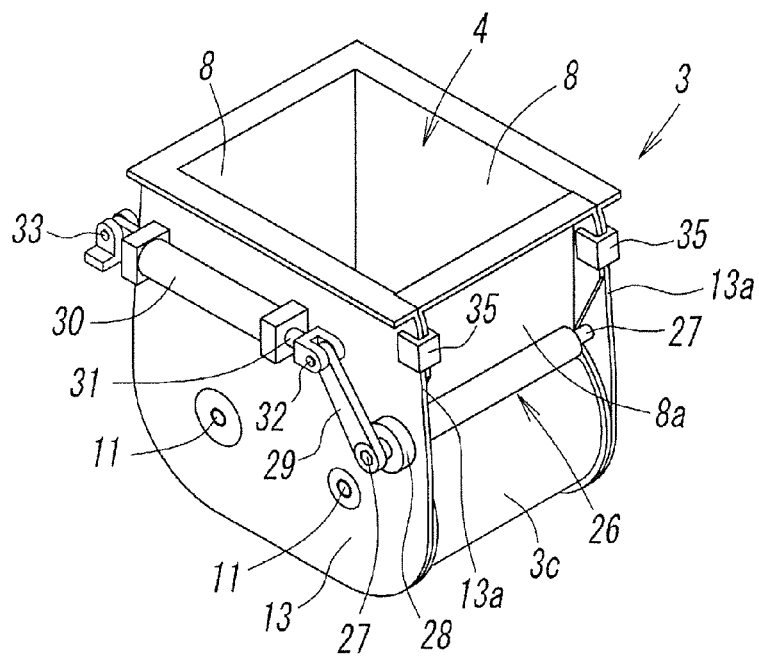
FIG. 3 A perspective view showing a structure of an opening and closing mechanism for a front fall in an opening of a stocking opening in the kneading tank.

FIGS. 1 to 6 show an example of carrying out a kneading tank inversion discharging sealed pressurized type kneading machine according to the present invention. The sealed pressurized type kneading machine of this embodiment schematically includes, on a bed 1, a support frame 2 for supporting required elements described below for the kneading machine and a kneading tank 3, the support frame 2 supporting, via a lid-pressurizing mechanism 6, a pressurizing lid 5 for opening and closing a stocking opening 4 which is formed into a tetragonal cylinder and provided in the upper surface of the kneading tank 3 and for pressurizing kneaded materials in the kneading tank 3. In the kneading tank 3, two C-shaped partial cylinders 3a are horizontally disposed so as to be opposed to each other and made continuous with each other, and a kneading chamber 7 is formed inside thereof. A kneading rotor 10 is provided in each of the two partial cylinders 3a, and shafts 11 of the kneading rotors 10 are, as shown in FIG. 3, rotatably supported by a pair of end plates 13 connected to both ends of the C-shaped partial cylinders 3a in the kneading tank 3, and connected to a driving source (not shown) that rotatably drive them.

The stocking opening 4 in the upper part of the kneading chamber 7 is provided with opening walls 8 surrounding four sides of the stocking opening, and the pressurizing lid 5 that opens and closes the stocking opening 4 of the kneading tank 3 by ascending and descending along the inner surfaces of the opening walls 8 can be driven so as to ascend and descend by the lid-pressurizing mechanism 6 disposed above the kneading tank 3. The pressurizing lid 5 is provided for, at the time of kneading and the like of powder compound, sealing with the opening walls 8 around the stocking opening 4 of the kneading tank 3, and also for pressurizing the kneaded materials in the kneading tank 3. Further, the lid-pressurizing mechanism 6 of the pressurizing lid 5 is constituted by a fluid-pressure cylinder apparatus 14, and the pressurizing lid 5 is attached to a piston rod 15 thereof via a connection member 16. This pressurizing lid 5 can be moved to and retained at, by the fluid-pressure cylinder apparatus 14, an ascended position shown in FIG. 5, an intermediate stop position shown in FIG. 1 by a solid line, and a lower limit position (kneading position) shown in FIG. 1 by a chain line.

In order to discharge kneaded materials A that is finished being kneaded from the kneading tank 3 by inversion, the kneading tank 3 is equipped with, on the bed 1, a kneading tank inversion mechanism that is supported so as to be rotatable in a range of 90 to 120° by an inversion shaft 12 about a central axis in the shaft 11 of the kneading rotor 10 on one side (inversion side) in the kneading tank 3 and that is constituted by a fluid-pressure cylinder 18 as a driving source as shown in FIG. 2. The fluid-pressure cylinder 18 is supported onto the bed 1 by a horizontal shaft 21 orthogonal to its piston rod 19, and a tip end of the piston rod 19 is rotatably connected by a pin 24 to a tip end of an inversion lever 23 that is protruded in a direction orthogonal to the shaft 12 from around the inversion shaft 12 in the kneading tank 3. Accordingly, driving of the piston rod 19 can cause the kneading tank 3 to rotate between a position of the solid line in FIG. 2 at which the stocking opening 4 of the kneading tank 3 faces upward and a position of the chain line in FIG. 2 at which the kneading tank 3 is inverted by 90° with respect to the above-mentioned position.

Figure 5:
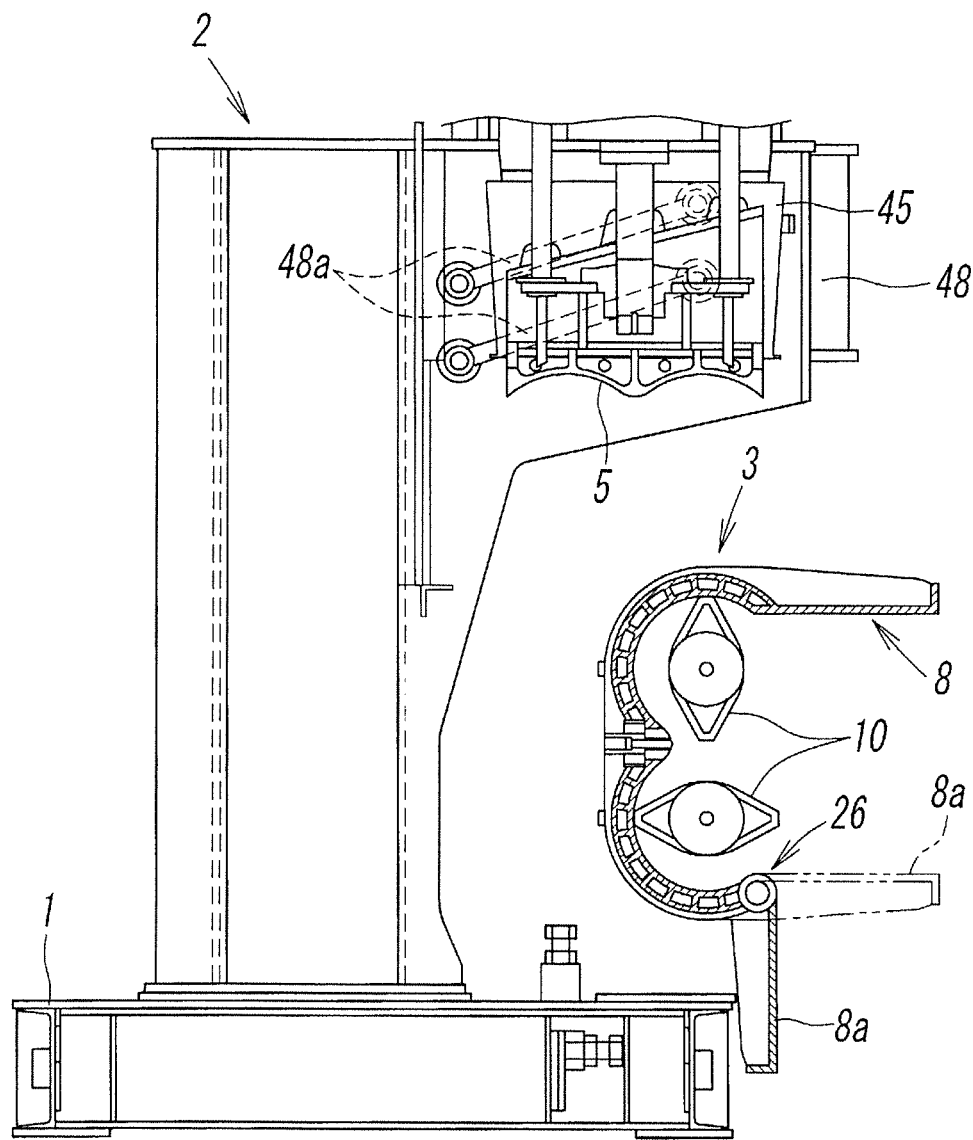
FIG. 5 A sectional view on the side of important portions showing a state in which the kneading tank is inverted by 90° and the front wall in the opening of the kneading tank is opened.
Figure 6:
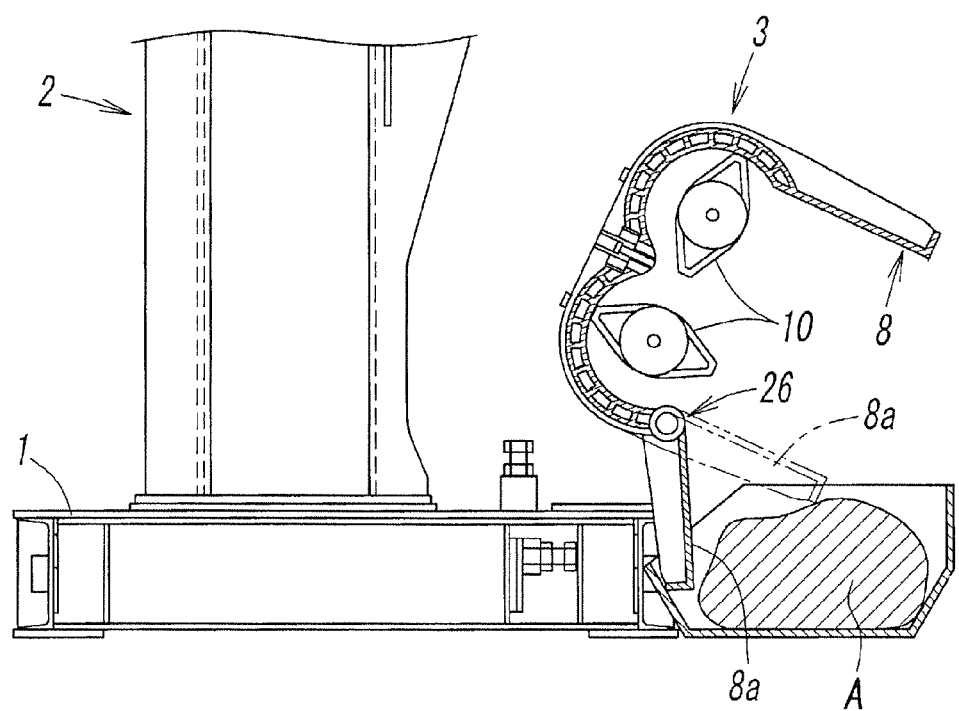
FIG. 6 A sectional view on the side of important portions showing a state in which the kneading tank is inverted by 110° and the front wall in the opening of the kneading tank is opened.
Figure 7:
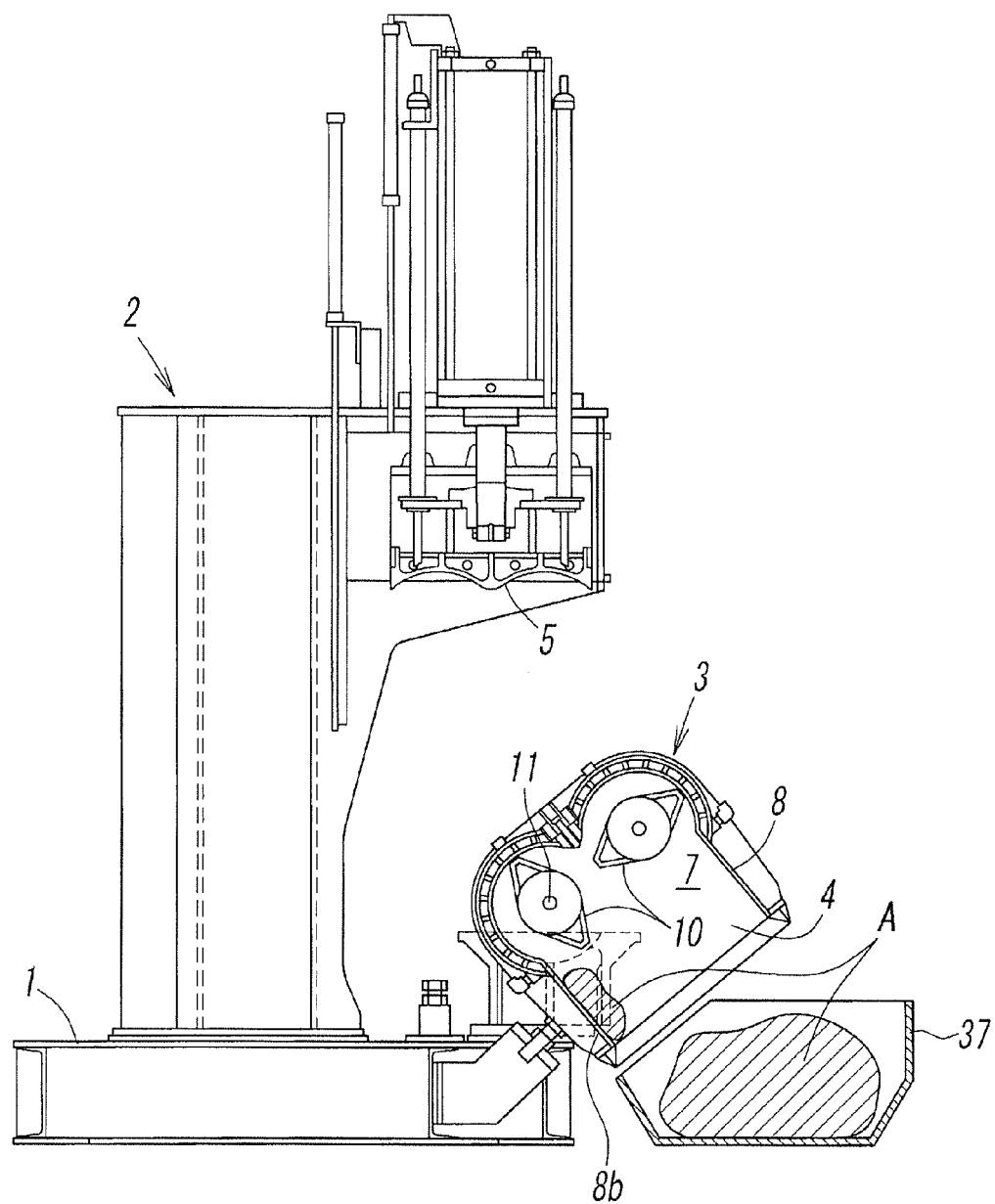
FIG. 7 A sectional view on the side of important portions showing a state in which a kneading tank in a conventional kneading tank inversion discharging type kneading machine is inverted by 140° and kneaded materials are discharged.

The inverting angle of the kneading tank 3 is not limited to the example of 90° inversion shown in FIGS. 2 and 5, and the kneading tank 3 can be rotated generally in the range of 90° to 120° from the position at which the stocking opening faces upward including the angle range as shown in FIG. 6. Further, although it is not clearly shown in the figures, the range of inversion of the kneading tank 3 is set by a stopper. It was confirmed by experiments that, when the kneading tank 3 is inverted by a kneading tank inversion mechanism driven by fluid pressure of the fluid-pressure cylinder 18 in such angle range, the operation time can be reduced to one-eighth although it is relatively small, compared with a conventional inversion mechanism using an electric rotation driving machine.

The four sides in the upper part of the kneading tank 3 are continuous with the opening walls 8, and the opening walls 8 are formed into a rectangle cylinder form as a whole by upper parts of the pair of end plates connected to the both ends of the partial cylinders 3a of the kneading tank 3, an upper wall continuous with the upper end of one of the pair of partial cylinders 3a so as to extend upward therefrom, and a front wall 8a disposed so as to extend upward from the upper end of the other one of the partial cylinders 3a, the front wall 8a being rotatable by a hinge 26. In particular, the from wall 8a is positioned at an inversion side of the kneading tank 3 and is structured as a movable one separated from the opening walls 8 positioned in other portions. In order that the kneaded materials A kneaded in the kneading tank 3 can be easily discharged, the front wall 8a is formed, as clearly shown in FIG. 5 and FIG. 6, so as to be suspended downward from the lower part of the stocking opening 4 in the hinge 26 when the kneading tank 3 is inclined by the above-mentioned inversion of the kneading tank 3 to the inversion position shown by the chain line in FIG. 2. Further, the front wall 8a shown by a chain line in FIG. 6 exhibits a state in which the front wall 8a is not suspended down as in conventional cases.

As shown in FIG. 3, both ends of the front wall 8a of the kneading tank 3 constituting a part of the opening walls 8 are provided with cramps 35 that are engaged and disengaged with respect to front edges 13a of the end plates 13 forming the adjacent opening walls 8 of the kneading tank 3 when the kneading tank 3 is at the kneading position shown in FIG. 1. Further, support shafts 27 fixed to the lower end of the front wall 8a to thereby constitute the hinge 26 are rotatably supported by a bearing 28 provided to the end plate 13, and a shaft end of the support shaft 27 protruding outside through the bearing 28 of one of the end plates 13 is connected with an arm 29 protruding in a direction orthogonal to the axis direction of the support shaft 27. The tip end of the arm 29 and the tip end of a piston rod 31 of a driving cylinder 30 that is supported with respect to the end plate 13 by a shaft 33 and constitutes a driving mechanism are rotatably connected to each other by a pin 32.

The driving cylinder 30 is controlled by a control apparatus (not shown) so that the piston rod 31 is driven so as to advance simultaneously with inversion movement of the kneading tank 3 caused by the fluid-pressure cylinder 18 constituting the kneading tank inversion mechanism. When the driving cylinder 30 is driven, firstly, engagement of the cramps 35 with the end plates 13 is cancelled, subsequently, the kneading tank 3 is inclined by the fluid-pressure cylinder 18 and simultaneously the front wall 8a opens, as shown in FIG. 5 or FIG. 6, to a position at which the front wall 8a is suspended downward or a kneaded material discharging position near the above-mentioned position, and the kneaded materials A in the kneading tank 3 are discharged to a receiving container 37 with the aid of a rotation force of the kneading rotors 10.

In the above-mentioned kneading machine, operations of discharging the kneaded materials A after completion of kneading are performed by inverting the kneading tank 3 by 90 to 120° as described above. When it is stopped at an inversion position, the front wall 8a is opened by the driving cylinder 30. By rotating the kneading rotors 10 in this state, the kneaded materials A in the kneading tank 3 are discharged from the kneading tank 3 like falling directly outside the tank in the manner of raking out the kneaded materials A in the kneading tank 3. Although the receiving container 37 is let stand by at the position on which the kneaded materials A fall, most of opening portions of the kneading tank 3 faces the receiving container 37 and the opening walls 8 except the front wall 8a are disposed at positions at which the opening walls 8 cover the receiving container 37, and hence, danger brought by rotation of the kneading rollers 10 does not reach an operator.

Further, when the stocking opening 4 of the above-mentioned inverted kneading tank 3 returns to the upward direction, the fluid-pressure cylinder 18 and the driving cylinder 30 perform reverse operations from that described above. As a result, the front wall 8a of the opening walls 8 takes an upright position similar to other opening walls 8, and the cramps 35 at both ends thereof are automatically engaged with front edges 13a of the end plates 13 forming the opening walls 8 adjacently to the cramps 35. Thereby, the front wall 8a takes the kneading position at which the stocking opening 4 of the kneading tank 3 is surrounded, and the upper part of the kneading tank 3 is formed into a tight cylinder form which does not cause leaking of the powder.

As shown in FIG. 1, two guide rods 40 that are fixed to the connection member 16 and extend in parallel with the piston rod 15 of the fluid-pressure cylinder apparatus 14 are guided by the support frame 2 and protruded above the support frame 2. A cooling-water pipe 42a for feeding cooling water to a cooling chamber 41 provided inside the pressurizing lid 5 is inserted into one of the guide rods 40, and a cooling-water discharging pipe 42b for circulating and discharging the cooling water is inserted into the other guide rod 40 so that the pressurizing lid 5 can be cooled. The cooling-water pipe 42a and the cooling-water discharging pipe 42b are respectively connected to a source of supply of the cooling water via flexible tubes, respectively. Further, a cooling jacket 43 is also provided to the outer circumference of the kneading tank 3, and the cooling water is circulated through the jacket 43 through a passage (not shown), to thereby similarly perform cooling.

Figure 4:
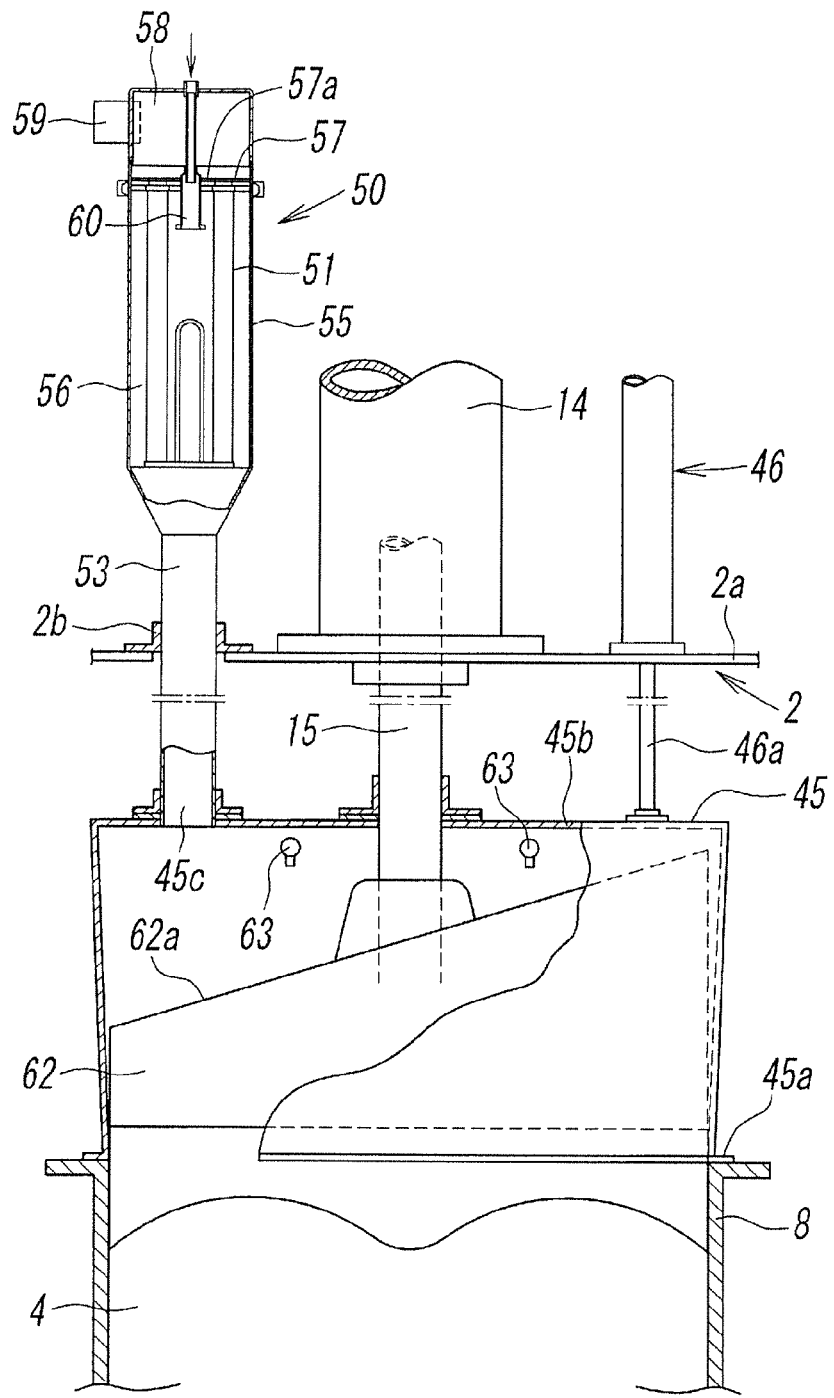
FIG. 4 A partial sectional view showing a structure of a dust catching filter above an inner-pressure cover equipped in the kneading machine.

As shown in FIG. 1 and FIG. 4, on the frame 2, there is provided an inner-pressure cover 45 that is disposed so as to cover the stocking opening 4 of the kneading tank 3 together with the pressurizing lid 5 for opening and closing the upper surface of the stocking opening 4 of the kneading tank 3, the inner-pressure cover 45 being able to ascend and descend by an ascending and descending mechanism 46 such as a cylinder. This inner-pressure cover 45 is formed so as to seal the stocking opening 4 of the kneading tank 3 by bringing its lower periphery 45a into pressure-contact with the upper edge of the opening walls 8 of the kneading tank 3 in a close contact state. Therefore, when the inner-pressure cover 45 descends, the stocking opening 4 of the kneading tank 3 and the pressurizing lid 5 covering the same are covered, and it is possible to restrain powder compound and the like stocked in the kneading tank 3 from diffusing outside.

Hereinafter, more concrete description is. The interior space of the inner-pressure cover 45 is structured so that the pressurizing lid 5 can move upward, in the state where the inner-pressure cover 45 is in pressure-contact with the peripheries of the opening walls 8 of the kneading tank 3, at least by the intermediate stop position (position of solid line in FIG. 1) for pre-kneading at which the pressurizing lid 5 reaches the upper end portion of the opening walls 8. Thereby, there is constituted a compound sealing mechanism for retaining powder compound together with the replaced air jetting into the inner-pressure cover 45 through the circumference of the pressurizing lid 5 from the kneading tank 3 with being accompanied by the powder compound when the pressurizing lid 5 is descended from the intermediate stop position in the state where the inner-pressure cover 45 is in pressure-contact with the peripheries of the opening walls 8 of the kneading tank 3.

The ascending and descending mechanism 46 for the inner-pressure cover 45 is constituted by providing necessary numbers of fluid-pressure cylinder apparatus as shown in FIG. 4 onto the support frame 2, and the piston rod 46a is connected to the inner-pressure cover 45 so as to be movable to the ascended position shown in FIG. 5 and the descended position shown in FIG. 1, but the ascending and descending mechanism is not limited to such structure. The reference numeral 48 shown in FIG. 1 is a dustproofing cover surrounding three directions of the opening walls 8 provided because the inner-pressure cover 45 is at the upper limit position during an operation of inputting materials to the kneading tank 3 and it is impossible to prevent scattering of the inputted powder compound to be inputted. This dustproofing cover 48 uses, as fulcrums, pivots of dustproofing-cover ascending and descending arms 48a rotatably supported by the support frame 2. Therefore, ascending and descending tracks thereof draw an arc so that the dustproofing cover 48 opens and closes without coming in contact with components on the opening walls 8.

Further, as FIG. 1 and FIG. 4 show, through the inner-pressure cover 45, the piston rod 15 of the fluid-pressure cylinder apparatus 14 for driving the pressurizing lid 5 to ascend and descend the same, and the guide rods 40 for guiding ascending and descending of the pressurizing lid 5 are airtightly and slidably penetrated. The pressurizing lid 5 can be ascended and descended independently of the inner-pressure cover 45 within the range of not interfering with the inner-pressure cover 45. However, if necessary, it may be structured so that a control circuit can move the inner-pressure cover 45 in conjunction with ascending and descending of the pressurizing lid 5 and cancel the conjunction.

In addition, in the inner-pressure cover 45, a lower end of a duct 53 of a capturing apparatus 50 with a filter 51 built therein is connected to an exhaust hole 45 provided to a top plate 45b of the inner-pressure cover 45. This capturing apparatus 50 is for capturing the powder compound accompanied by the air discharged from the circumference of the pressurizing lid 5 at the time of pressure increase in the kneading chamber 7. The inside of the inner-pressure cover 45 is made continuous via the duct 53 with a space 56 formed between a cylindrical filter 51 in the capturing apparatus 50 and an outer cylinder 55 as a part accommodating the filter 51, and the upper end of the space 56 is closed by a partitioning wall plate 57 that fixes the upper part of the cylindrical filter 51. The opened part at the upper end of the cylindrical filter 51 whose lower end is closed is opened to the atmosphere through a central hole 57a of the partitioning wall plate 57, a ventilation chamber 58 above the partitioning wall plate 57, and an exhausting duct nozzle 59 provided with a damper (not shown). Further, the duct 53 is provided upright in the driving direction of the inner-pressure cover 45 by the ascending and descending mechanism 46, and a seal ring 2b in the top plate 2a of the support frame 2 is slidably penetrated therethrough.

Further, the capturing apparatus 50 is provided with a pressurizing air-nozzle 60 for brushing off the powder compound captured in the filter 51 by an air stream in the opposite direction from that of the capturing. This pressurizing air-nozzle 60 is for returning the powder compound accumulated on the filter 51 to the kneading tank 3 from the duct 53 through the interior of the inner-pressure cover 45 so as to obtain kneaded materials of accurate compound prescription. In particular, when kneading in the kneading tank 3 advances and the temperature of the kneaded materials is increasing, the temperature of the air in the kneading chamber 3 also increases to thereby increase the pressure. Therefore, the air jets from the kneading tank 3 to the side of the inner-pressure cover 45 with being accompanied by the powder compound, the gas in the inner-pressure cover 45 flows into the capturing apparatus 50 with a pressure increase inside the inner-pressure cover 45, and the powder compound accompanied by the gas is filtered by the filter 51. The pressurizing air-nozzle 60 in the capturing apparatus 50 is mainly for collecting the filtered powder compound into the kneading tank 3 through the inner-pressure cover 45.

In order to easily gather the powder compound accumulated in the inner-pressure cover 45 to be returned to the kneading tank 3, the pressurizing lid 5 in the inner-pressure cover 45 is attached with a cover member 62 for covering all upper surfaces of components on the upper surface of the pressurizing lid 5 such as the connection member 16. The upper surface of the cover member 62 at least covers the entire of the plane form of the pressurizing lid 5, and therefore, the powder compound scattered into the inner-pressure cover 45 will be accumulated on the cover member 62 or a circumferential portion of the pressurizing lid 5. Further, the upper surface of the cover member 62 is formed as a slope portion 62*a* inclined to one side, and air nozzles 63 for blowing off the powder compound accumulated on the slope portion 62*a* along the slope portion 62*a* to the downstream side thereof are provided to the upper part in the inner-pressure cover 45. Therefore, by air blows from the air nozzles 63, the powder compound accumulated on the inner-pressure cover 45 is caused to flow down to the circumferential portion of the pressurizing lid 5, and the powder compound can be gathered therein.

In FIG. 1 and FIG. 4, the slope portion 62*a* of the cover member 62 is formed so as to be inclined to one side, but the slope portion 62*a* may be inclined to a plurality of directions, and in such case the air nozzles 63 are to be provided at points which are appropriate for causing the powder compound to flow down along the slope portion 62*a* in the inner-pressure cover 45. Further, it is preferable that an inclination direction of the slope portion 62*a* be considered also in relation to the position of the exhaust hole 45*c* of the inner-pressure cover 45 at which the duct 53 of the capturing apparatus 50 opens. For example, it is possible to take measures for facilitating collection of the powder compound, such as structuring the exhaust hole 45*c* to be positioned at the downstream side of the slope portion 62*a*.

In a space between the inner-pressure cover 45 and the pressurizing lid 5, the air blows from the air nozzles 63 cause the powder compound accumulated on the slope portion 62*a* of the cover member 62 to be collected in the circumferential portion of the pressurizing lid 5. This collected powder compound is inhaled into the kneading tank 3 with pressure decrease in the kneading tank 3 caused by ascending of the pressurizing lid 5 of the kneading tank 3. Therefore, a mechanism for ascending the pressurizing lid 5 constitutes a collecting mechanism for collecting powder compound in the circumferential portion of the pressurizing lid. In the circumferential portion of the pressurizing lid 5, the pressurizing lid 5 itself or the cover member 62 may be provided with a space in which the powder compound to be collected in the kneading tank 3 by the collecting mechanism is temporarily accommodated in the manner of easily being inhaled into the kneading tank 3.

Further, in the kneading machine, an external dust catching machine is provided separately from the capturing apparatus 50, and this dust catching machine is installed mainly for the purpose of inhaling the air in the inner space of the dustproofing cover 48 disposed outside the inner-pressure cover 45 in order to prevent generation and diffusion of dusts of the powder compound caused when the inner-pressure cover 45 and the pressurizing lid 5 are ascended to thereby open the stocking opening 4 in the upper surface of the kneading tank 3 for inputting the powder compound.

Next, description is made on operations of the sealed pressurized type kneading machine. In the sealed pressurized type kneading machine, when compound materials and the like are stocked with the kneading machine 3, the dustproofing cover 48 surrounds three directions of the stocking opening 4 with the stocking opening 4 facing upward, and the pressurizing lid 5 and the inner-pressure cover 45 are ascended by the uppermost position shown in FIG. 5, and then the powder compound are inputted together with high-viscosity materials to be kneaded such as lubbers and plastics. In this state, the portion above the kneading rotors 10 of the kneading tank 3 constitute a hopper portion for accommodating the compound materials, and the hopper portion is surrounded by the opening walls 8 from the upper circumference thereof.

After the high-viscosity materials to be kneaded and the powder compound are inputted to (stocked with) the kneading tank 3, as shown in FIG. 1, the inner-pressure cover 45 is descended by the lower limit position by driving of the ascending and descending mechanism 46 formed of the fluid-pressure cylinder, and simultaneously the pressurizing lid 5 is descended by the intermediate stop position by driving of the fluid-pressure cylinder apparatus 14. Firstly, the lower periphery 45*a* of the inner-pressure cover 45 is brought into close contact with the upper edge of the kneading tank 3, so that the inner-pressure cover 45 airtightly seals the stocking opening 4 of the kneading tank 3 via a seal member. Further, rotation of the kneading rotors 10 is started in the state where the pressurizing lid 5 is descended by the intermediate atop position, and the powder compound is pre-kneaded.

When the pressurizing lid 5 is descended, with entry of the pressurizing lid 5 into the opening walls 8 of the stocking opening 4, the entering volume of the pressurizing lid 5 is replaced by the air in the kneading tank 3, and therefore, a part of the air in the kneading tank 3 is pushed out to the side of the inner-pressure cover 45 via a gap around the pressurizing lid 5. At this time, being accompanied by the moving air, the powder compound reasonably jets and flows at high speed and at high concentration to the side of the inner-pressure cover 45. However, closed spaces are formed in the kneading tank 3 and the inner-pressure cover 45, and therefore the powder compound diffused and floating in the moving air is to be accumulated on the upper surface side of the pressurizing lid 5 or a circumference thereof. Further, this movement of the air is the air movement only between the inner-pressure cover 45 and the kneading tank 3, and pressures in the kneading tank 3 and the inner-pressure cover 45 do not change. Therefore, even when the powder compound flows into the side of the inner-pressure cover 45 by being accompanied by the moving air, it does not flow outside from the inner-pressure cover 45 which is at an atmospheric pressure.

Further, as described above, as kneading in the kneading tank 3 advances and the temperature of the kneaded materials increases, the temperature of the air in the kneading tank 3 also increases. Pressure increase by expansion of the air, or expansion of gas volume by evaporation of water in the kneaded materials or volatile gas from organic materials result in jetting of the air and the gas from the kneading tank 3 to the side of the inner-pressure cover 45 with accompanying the powder compound, and flow into the capturing apparatus 50 because the inner-pressure cover 45 forms a closed space. The powder compound accompanied by the gas is captured by the filter 51.

Therefore, at the stage at which the kneading advances moderately and the powder compound is kneaded, the powder compound captured by the filter 51 is collected into the kneading tank 3 through the inner pressure cover 45. In the collection, firstly, the damper in the exhaust duct nozzle 59 connected to the ventilation chamber 58 in the capturing apparatus 50 is closed, the pulse air is caused to blow at once into the inside of the filter 51 from the pressurizing air-nozzle 60 for brushing off dusts, to thereby brush off the powder compound captured in the outside of the filter. As a result, the brushed-off powder compound falls and flows into the inner-pressure cover 45 via the duct 53, and eventually sinks to be accumulated on the slope portion 62a and the like on the upper surface of the cover member 62 of the pressurizing cover 5. Therefore, it is possible to cause the powder compound to flow down to the circumferential portion of the pressurizing lid 5 and be collected therein by the air blows from the air nozzles 63 provided in the upper part in the inner-pressure cover 45.

When the pressurizing lid 5 is ascended, since the pressure in the kneading tank 3 decreases and simultaneously the air in the inner-pressure cover 45 is compressed, an air current moving to the kneading tank 3 side is generated in the circumference of the pressurizing lid 5. Therefore, the powder compound collected in the circumferential portion of the pressurizing lid 5 is accompanied by this air current and flows down and collected into the kneading tank 3 and kneaded into the kneaded materials under kneading. The above-mentioned air blows from the air nozzles 63 in the inner-pressure cover 45 may be performed at this time. It is very effective for manufacturing kneaded materials of a quality following accurate compound prescription to catch almost all the amount of the powder compound jetting from the kneading tank 3 by the filter 51 of the capturing apparatus 50 and collect the powder compound into the kneading tank 3 to thereby knead the powder compound in the same batch. It improves reliability of quality and it is also effective for resource reduction by valuable collection of materials and reduction of dust wastes.

The above-mentioned operations for discharging the kneaded materials by the kneading machine are performed as follows: with the dustproofing cover 48 disposed on the front side of the stocking opening 4 in the frame 2 being opened, the inner-pressure cover 45 and the pressurizing lid 5 above the kneading tank 3 that has completed kneading are successively ascended; after the pressurizing lid 5 reaches the upper limit, two kneading rotors 10 are rotated at low speed to a disengaging side while starting forward-inclination inversion of the kneading tank 3 by the fluid-pressure cylinder 18 simultaneously starting opening of the front wall 8a by the driving cylinder 30. When the kneading tank 3 is inverted by 90° to 120°, the front wall 8a is opened to a suspended-down position shown in FIG. 5 or FIG. 6. If the kneading rotors 10 are rotated forward and backward in this state, the kneaded materials A are discharged outside the tank without discharging assist operation by the operator.

In the trial product experiments on the kneading machine of the present invention described above, the following is confirmed: when kneading is finished and the inner-pressure cover is ascended, on the slope portion 62a of the upper surface of the cover member 62 of the pressurizing lid 5, there is no powder compound left accumulated of powder compound brushed off from the filter 51 by the pulse air from the pressurizing air-nozzle 60, and the powder compound was kneaded in the kneading chamber. Further, when the exhaust air emitted to the atmosphere from the exhaust duct nozzle 59 of the capturing apparatus 50 is passed through the external dust catching machine, traces of captured powder compound or adhesion of powder compound were not found in its filter and the inner surface of the duct leading to the dust catching machine, and it was confirmed that approximately 100% of the inputted powder compound is kneaded. Incidentally, a collection rate of the powder compound can be determined by comparing the total weight of the inputted powder compound with the weight of the kneaded materials. In this case, because the kneading temperature reaches 130 to 150° during kneading, some ingredients are volatilized and evaporation of moisture happens, and approximately 0.3% of a decrease in weight was confirmed.

In addition, the following was confirmed: at the stage of discharging the kneaded materials A from the kneading tank 3, even in the state where the front wall 8a of the opening walls 8 of the kneading tank 3 is suspended down as shown in FIG. 5 and the kneading tank 3 is inverted by 90° and two kneading rotors 10 in the kneading tank 3 are vertically arranged, it is possible to easily rake out the kneaded materials from the kneading tank 3 by rotations of the kneading rotors 10 and make the kneaded materials 3 fall directly outside the tank. Even in the case of discharging viscous kneaded materials, it was possible to increase the discharging speed by increasing the inverting angle by, for example, approximately 100° to 110°.

The above-mentioned kneading machine of the present invention can not only approximate low productivity, which is a weak point of a light-structure type kneading tank inversion discharging type kneading machine to the performance of a heavy-structure type kneading tank bottom opening discharging type kneading machine, but also secure design quality and enable valuable collection of resources and drastic reduction of wastes by collecting and kneading nearly 100% of the stocked powder compound into products compared with a conventional dustproofing type which prevents dust diffusion of the powder compound by absorption of scattered powder compound by the external dust catching machine.

Incidentally, kneading machines of Japan Patent No. 3129966 and Japan Patent No. 4198665 previously invented by inventors of the present invention have excellent energy-saving performance. By applying the technologies of the above-mentioned patents to the present invention, it is possible to provide an advanced function sealed type kneading machine which can be expected to give great contribution to rubber and plastic industries of the coming low carbon age.

DESCRIPTION OF REFERENCE SYMBOLS 2 support frame
3 kneading tank
3a partial cylinder
4 stocking opening
5 pressurizing lid
8 opening wall
8a front wall
10 kneading rotor
11 shaft
13 end plate
14 fluid-pressure cylinder apparatus
15 piston rod
26 hinge
27 support shaft
28 bearing
29 arm
30 driving cylinder
31 piston rod
32 pin
35 cramp 45 inner-pressure cover
45b top plate
45c exhaust hole
46 ascending and descending mechanism
48 dustproofing cover
48a dustprofing-cover ascending and descending arm
50 capturing apparatus
51 filter
53 duct
60 pressurizing air-nozzle
62 cover member
62a slope portion
63 air nozzle
A kneaded material

The invention claimed is:

1. A kneading tank inversion discharging sealed pressurized type kneading machine for high-viscosity materials to be kneaded comprising:
a kneading tank having a stocking opening that is provided in an upper surface thereof and made closable by an openable and closable pressurizing lid; and two rotating kneading rotors provided in parallel in the kneading tank, the kneading tank being capable of inverting about an axis of one of the kneading rotors for discharging kneaded materials,
wherein opening walls having inner surfaces along which a circumference of the pressurizing lid ascends and descends are provided so as to surround four sides of the stocking opening in an upper part of the kneading tank, the opening walls including a front wall positioned at an inversion side of the kneading tank, and a lower end of the front wall is rotatably attached to the kneading tank with a hinge in order that the front wall is suspended downward from the kneading tank when the kneading tank is inverted, and
the kneading tank is capable of inverting in a range of 90 to 120° from a position at which the stocking opening faces upward.

2. The kneading tank inversion discharging sealed pressurized type kneading machine according to claim 1,
wherein the kneading tank is constituted by horizontally disposing two C-shaped partial cylinders so as to be opposed to each other and become continuous with each other, each kneading rotor provided in each of the two partial cylinders of the kneading tank, and shafts of both the kneading rotors are rotatably supported by a pair of end plates connected to both ends of the partial cylinders and the shafts are connected to a driving source that rotatably drives the shafts.

3. The kneading tank inversion discharging sealed pressurized type kneading machine according to claim 2,
wherein cramps that are engaged and disengaged with respect to front edges of the end plates of the kneading tank forming the adjacent opening walls are provided to both ends, respectively, of the front wall of the opening walls,
the front wall is displaceable between a kneading position and a kneaded material discharging position by making a support shaft provided to a lower end of the front wall of the opening walls to constitute the hinge rotatable by a driving mechanism supported by the end plate, the kneading position being a position at which the cramps are engaged with the front edges of the end plates and the stocking opening of the kneading tank is surrounded, the kneaded material discharging position being a position at which the cramps are disengaged and the front wall is suspended downward for discharging the kneaded materials by inversion of the kneading tank.

4. The kneading tank inversion discharging sealed pressurized type kneading machine according to claim 3,
wherein the support shaft provided to the lower end of the front wall to constitute the hinge are rotatably supported by a bearing provided to the end plate, an outer end of the support shaft protruding to an outside through the bearing of the end plate is connected to an arm protruding to a direction orthogonal to an axis direction of the support shaft, and a tip end of the arm and a tip end of a piston rod of a driving cylinder that is supported by the end plate and constitutes a driving mechanism are rotatably connected to each other by a pin; and
the driving cylinder makes the front wall to be displaceable between the kneading position at which the stocking opening is surrounded and the kneaded material discharging position for discharging the kneaded materials.

5. The kneading tank inversion discharging sealed pressurized type kneading machine according to claim 1,
wherein there is provided an inner-pressure cover that seals the stocking opening of the kneading tank by covering the stocking opening of the kneading tank together with the pressurizing lid that opens and closes the upper surface of the stocking opening and by being brought into pressure-contact with peripheries of the opening walls of the kneading tank by an ascending and descending mechanism, and a piston rod in a fluid-pressure cylinder apparatus on a support frame that drives the pressurizing lid to ascend and descend and to penetrate airtightly and slidably through the inner-pressure cover,
an interior space of the inner-pressure cover is structured so that, in the state in which the inner-pressure cover is in pressure-contact with the peripheries of the opening walls of the kneading tank, the pressurizing lid is movable upward at least by an intermediate stop position at which the pressurizing lid reaches upper end portions of the opening walls,
thereby, there are constituted: a compound sealing mechanism for retaining, in the inner-pressure cover, the powder compound together with a replaced air jetting from the kneading tank into the inner-pressure cover through the circumference of the pressurizing lid with accompanying the powder compound when the pressurizing lid is descended from the intermediate stop position in the state in which the inner-pressure cover is in pressure-contact with the peripheries of the opening walls of the kneading tank; and
a collecting mechanism for absorbing and collecting the powder compound collected with a pressure decrease in an interior of the kneading tank below the pressurizing lid due to ascending of the pressurizing lid of the kneading tank by collecting the powder compound accumulated in a space between the inner-pressure cover and the pressurizing lid by an air blow in a circumferential portion of the pressurizing lid.

6. The kneading tank inversion discharging sealed pressurized type kneading machine according to claim 5,
wherein, to an exhaust hole provided in a top plate of the inner-pressure cover, a duct of a capturing apparatus equipped with a filter for capturing the powder compound jetted into the inner-pressure cover with accompanying the air jetting at the time of pressure increase in the kneading tank is connected, and an interior of the inner-pressure cover is made continuous with the atmosphere through the filter in the capturing apparatus, the duct is provided upright in a driving direction of the inner-pressure cover by the ascending and descending mechanism, and a top plate of the support frame is slidably penetrated through the duct, and the capturing apparatus is provided with a pressurizing air-nozzle that rakes off, from the filter, the powder compound captured in the filter by an air current in a direction opposite to the capturing and returns the powder compound into the inner-pressure cover through the duct.

7. The kneading tank inversion discharging sealed pressurized type kneading machine according to claim 5, wherein a cover member that covers an upper surface of the pressurizing lid is provided to the pressurizing lid as a means for collecting the powder compound accumulated in the inner-pressure cover by the air blow, an upper surface of the cover member is formed as a slope portion, and the inner-pressure cover is provided with an air nozzle that blows off the powder compound accumulated on the slope portion to a downstream side of the slope portion.

8. The kneading tank inversion discharging sealed pressurized type kneading machine according to claim 6, wherein a cover member that covers an upper surface of the pressurizing lid is provided to the pressurizing lid as a means for collecting the powder compound accumulated in the inner-pressure cover by the air blow, an upper surface of the cover member is formed as a slope portion, and the inner-pressure cover is provided with an air nozzle that blows off the powder compound accumulated on the slope portion to a downstream side of the slope portion.

9. A kneading machine for high-viscosity materials comprising:

a kneading tank with walls defining an opening in an upper surface thereof and including two rotating kneading rotors in the kneading tank, the kneading tank rotatable about an axis of one of the kneading rotors for discharging kneaded materials;

a pressurizing lid configured to ascend to open the kneading tank and to descend to close the kneading tank;

wherein the tank includes a front wall rotatably attached to the kneading tank by a hinge; and wherein the kneading tank is rotatable in a range of 90 to 120° from a position in which the tank faces upward.

10. The kneading machine according to claim 9 further comprising:

two C-shaped partial cylinders, each of the two partial cylinders containing one of the kneading rotors;

a pair of end plates coupled to ends of the partial cylinders for rotatably supporting shafts of the kneading rotors; and a driving source coupled to the shafts for rotatably driving the shafts.

11. The kneading machine according to claim 10 further comprising:

cramps engageable at ends of the front wall and connecting the ends with front edges of the pair of end plates;

a rotatable support shaft constituting the hinge, rotation of the support shaft allowing movement of the front wall between a kneading position and a kneaded material discharging position; and a driving mechanism supported by at least one end plate for rotating the support shaft;

wherein, in the kneading position, the cramps are engaged with the front edges of the end plates and, in the kneaded material discharging position, the cramps are disengaged and the front wall is suspended downward for discharging the kneaded materials from the kneading tank.

12. The kneading machine according to claim 11 further comprising:

a bearing coupled to the at least one end plate and rotatably supporting the support shaft with one end of the support shaft extending through the bearing; and an arm coupled to the support shaft and extending in a direction orthogonal to the axis of the support shaft;

wherein the driving mechanism comprises a driving cylinder and a piston rod; and wherein one end of the arm and one end of the piston rod are coupled to one another by a pin.

13. The kneading machine according to claim 9 further comprising:

an inner-pressure cover that cooperates with the pressurizing lid to seal the opening of the kneading tank, the cover engaging walls of the kneading tank in a lowered position and defining an interior;

a piston rod for driving the pressurizing lid upwardly and downwardly in a slidable manner through the interior of the inner-pressure cover; and a collecting mechanism for collecting a powder compound introduced in the kneading tank;

wherein the interior of the inner-pressure cover is configured such that, when the cover is in the lowered position, the pressurizing lid is movable upwardly at least to an intermediate stop position at which the pressurizing lid reaches upper ends of the walls;

wherein the powder compound is blown from the kneading tank around the circumference of the pressurizing lid into the inner-pressure cover when the inner-pressure cover is in its lowered position and the pressurizing lid is lowered from the intermediate stop position; and wherein the powder compound is blown into the kneading tank around the circumference of the pressurizing lid when the pressurizing lid is raised due to a pressure decrease in the interior of the kneading tank.

14. The kneading machine according to claim 13 further comprising:

a capturing apparatus having a duct equipped with a filter for capturing the powder compound flowing into the inner-pressure cover due to a pressure increase in the kneading tank, the capturing apparatus having a pressurizing air-nozzle;

a top plate in the inner-pressure cover having an exhaust hole that is coupled to the duct, the interior of the inner-pressure cover being maintained at atmospheric pressure through the filter;

wherein the duct is upright and slidably penetrates a top plate of a support frame of the kneading machine; and wherein the pressurizing air-nozzle dislodges powder compound captured in the filter and returns the powder compound into the inner-pressure cover through the duct.

15. The kneading machine according to claim 14 further comprising:

a cover member covering an upper surface of the pressurizing lid for collecting powder compound accumulated in the inner-pressure cover, the cover member defining a slope portion; and an air nozzle for blowing powder compound accumulated on the slope portion to a downstream area of the slope portion.

* * * * *